(12) United States Patent
Etheridge et al.

(10) Patent No.: US 12,231,251 B1
(45) Date of Patent: **\*Feb. 18, 2025**

(54) USER INITIATED NOTIFICATIONS FOR CHAT SECTIONS

(71) Applicant: Zoom Video Communications, Inc., San Jose, CA (US)

(72) Inventors: Amanda Naomi Etheridge, Austin, TX (US); Sally Lu, Los Angeles, CA (US); Archil Vardidze, Austin, TX (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,609

(22) Filed: Dec. 13, 2023

Related U.S. Application Data

(63) Continuation of application No. 17/587,554, filed on Jan. 28, 2022, now Pat. No. 11,863,334.

(51) Int. Cl.
*H04L 12/18* (2006.01)
*H04L 51/046* (2022.01)

(52) U.S. Cl.
CPC ...... *H04L 12/1818* (2013.01); *H04L 12/1822* (2013.01); *H04L 51/046* (2013.01)

(58) Field of Classification Search
CPC ..................... H04L 12/1818; H04L 12/1822; H04L 51/046
See application file for complete search history.

(56) References Cited

U.S. PATENT DOCUMENTS

| | | | |
|---|---|---|---|
| 8,631,353 B2 | 1/2014 | Klassen et al. | |
| 11,329,940 B2* | 5/2022 | Robinson | H04L 51/42 |
| 11,531,646 B2 | 12/2022 | Meling et al. | |
| 2012/0173533 A1* | 7/2012 | Ramarao | G06Q 10/00 |
| | | | 707/E17.046 |
| 2016/0313877 A1 | 10/2016 | Ha et al. | |
| 2017/0075737 A1* | 3/2017 | Kim | G06F 3/0488 |
| 2018/0359353 A1* | 12/2018 | Vlandis | H04L 51/04 |

(Continued)

OTHER PUBLICATIONS

U.S. Appl. No. 17/587,554, "Non-Final Office Action", Feb. 17, 2023, 26 pages.

(Continued)

*Primary Examiner* — Nazia Naoreen
(74) *Attorney, Agent, or Firm* — Kilpatrick Townsend & Stockton LLP

(57) ABSTRACT

Example methods and systems for providing notifications of unread messages is provided. A client device detects an input action proximate to a folder created by a recipient user account. The folder includes one or more online chats. The one or more online chats includes at least one unread message. The client device provides a notification relating to the at least one unread message in the one or more online chats in the folder. The notification includes at least one online chat identity that correspond to at least one online chat of the one or more online chats including the at least one unread message. The client device receives a selection of a first online chat identity that corresponds to a first online chat within the folder. Based on the selection of the first online chat identity, the client device provides access to corresponding unread messages in the first online chat.

20 Claims, 14 Drawing Sheets

(56) References Cited

U.S. PATENT DOCUMENTS

2018/0367495 A1* 12/2018 Kim .................. H04L 51/56
2020/0274916 A1   8/2020 Choi
2022/0109707 A1   4/2022 Butterfield et al.

OTHER PUBLICATIONS

U.S. Appl. No. 17/587,554, "Notice of Allowance", Aug. 22, 2023, 8 pages.

* cited by examiner

FIG. 4B

USER INITIATED NOTIFICATIONS FOR CHAT SECTIONS

CROSS-REFERENCE TO RELATED APPLICATIONS

This application is a continuation U.S. patent application Ser. No. 17/587,554, filed Jan. 28, 2022, titled "User Initiated Notifications for Chat Sections," the entirety of which is hereby incorporated by reference.

FIELD

Various embodiments relate generally to digital communication, and more particularly, to unread messages.

SUMMARY

The appended Abstract may serve as a summary of this application.

BRIEF DESCRIPTION OF THE DRAWINGS

The present disclosure will become better understood from the detailed description and the drawings, wherein:

FIGS. 4A, 4B, 4C and 4D are each a diagram illustrating an exemplary environment in which some embodiments may operate.

DETAILED DESCRIPTION OF THE DRAWINGS

Figure 1A:
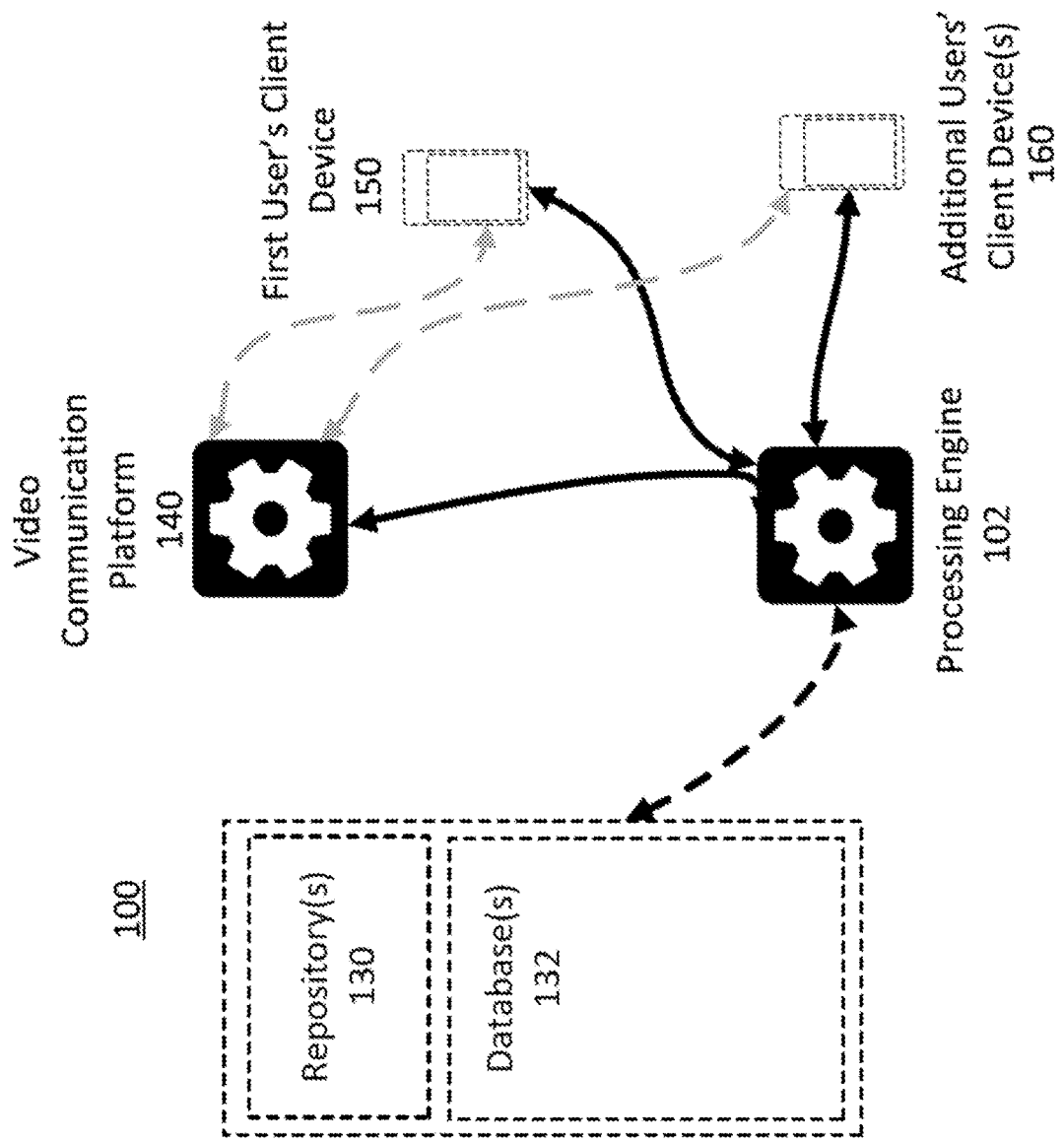
FIG. 1A is a diagram illustrating an exemplary environment in which some embodiments may operate.

Various embodiments of a Folder Engine are described herein that provide functionality for a user account to create and organize one or more folders with respect to a plurality of online chat sessions and/or online channels. In some embodiments, the user account may be a recipient user account that is receiving various messages via the online chat sessions and/or the online channels. Various embodiments of the Folder Engine as described herein provide functionality for a recipient user account to receive notifications of unread messages and online chat sessions and/or online channels whereby the respective notifications are displayed to the recipient user account in response to explicit input received from the recipient user account. For example, the input received from the recipient user account may be an occurrence of a hover action initiated and performed by the recipient user account.

According to one or more embodiments, the Folder Engine receives data from the recipient user account requesting creation a folder. The Folder Engine receives data from the recipient user account representing selection of the online chat session(s) and/or the online channel(s) that are to be included within the folder. The Folder Engine receives data from the recipient user account representing a determination by the recipient user account of an organizational order (such as a display order) of the online chat sessions and/or the online channels included in folder.

In one or more embodiments, the Folder Engine detects a specific type of input action performed by the recipient user account proximate to a folder or a collection of online chat sessions that currently include one or more unread messages. Based on detecting that specific type of input action, the Folder Engine displays a notification. In some embodiments, where the detected specific type of input action was applied proximate to a folder, the Folder Engine displays a notification that includes display of multiple identities of online chat sessions and/or online channels.

According to some embodiments, selection of an identity of a sender user account displayed in a notification, acts as a shortcut operation(s) for opening a folder in which a corresponding online chat session is located. In some embodiments, the sole location of the online chat session may be within the opened folder. The online chat session includes messages sent between the recipient user account and the sender user account as well as one or more unread messages sent from the sender user account to the recipient user account in the online chat session. The shortcut operation(s) further includes triggering access of the online chat session by the recipient user account and/or triggering access of one or more unread messages in the online chat session.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a sending client device 150, one or more receiving client device(s) 160 are connected to a processing engine 102 and, optionally, a communication platform 140. The processing engine 102 is connected to the communication platform 140, and optionally connected to one or more repositories 130 and/or databases 132 of historical virtual online event data, such as historical virtual meeting data One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment(s), the processing engine 102 may perform methods 500, 600 (of FIG. 5, 6) or other method herein. In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device(s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device(s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication. In some embodiments, the platform 140 may further be associated with a video communication environment and a video communication environment client application executed on one or more computer systems.

Figure 1B:
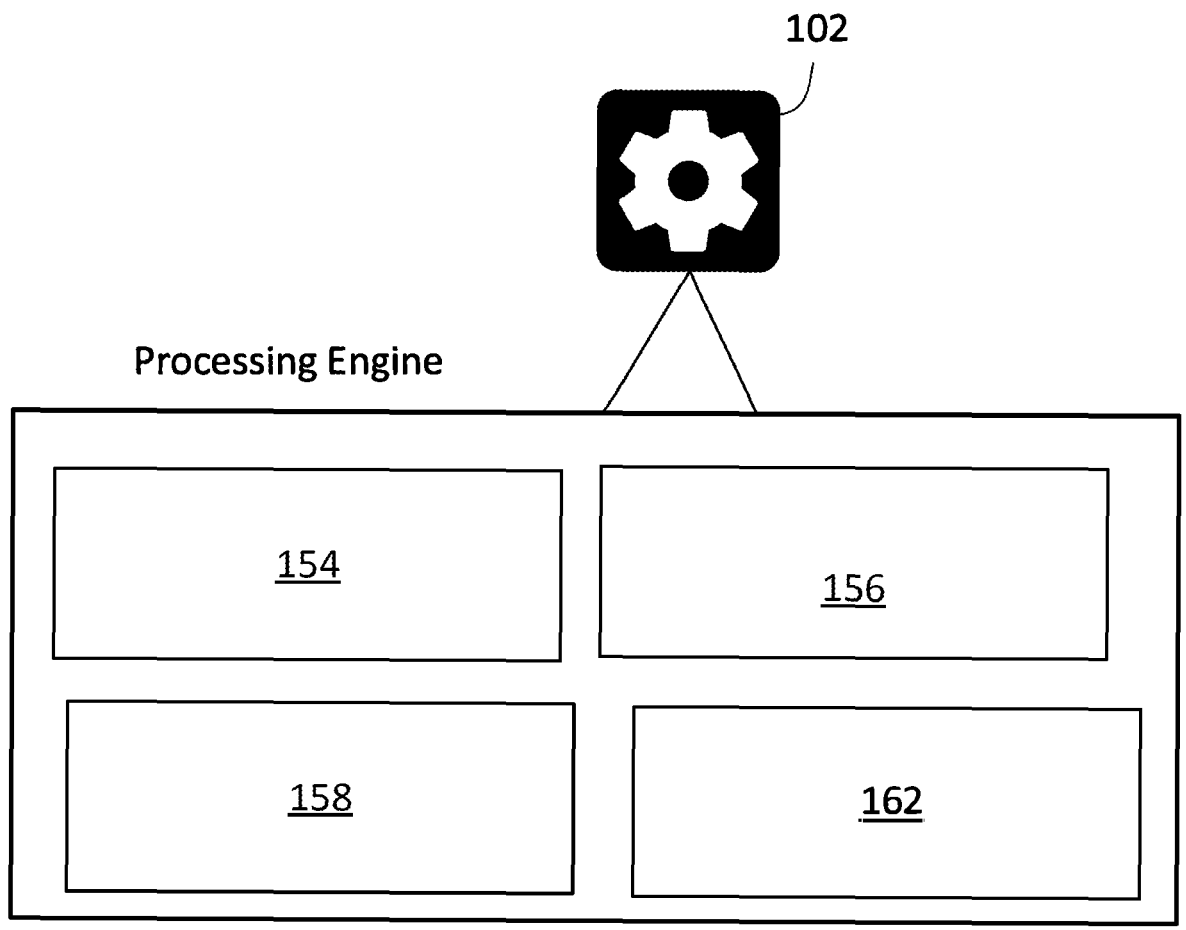
FIG. 1B is a diagram illustrating an exemplary environment in which some embodiments may operate.

FIG. 1B is a diagram illustrating exemplary software modules 154, 156, 158, 162 of a Folder Engine that may execute at least some of the functionality described herein. According to some embodiments, one or more of exemplary software modules 154, 156, 158, 162 may be part of the processing engine 102. In some embodiments, one or more of the exemplary software modules 154, 156, 158, 162 may be distributed throughout the communication platform 140.

The module 154 functions to detect one or more types of input actions. In some embodiments, the module 154 functions to detect a hover action(s).

The module 156 functions to initiate display of one or more notifications. In some embodiments, the module 156 functions to initiate display of a notification whereby a notification includes displays of one or more identities and badges.

The module 158 functions to receive selection of a notification. In some embodiments, the module 158 functions to receive selection of an identity of a sender user account or an online channel included in a display of a notification.

The module 162 functions to initiate access to an online chat session or online channel that corresponds with a selected notification. In some embodiments, the module 162 functions to initiate access to an online chat session or online channel that corresponds with an identity selected from a display of a notification.

The above modules 154, 156, 158, 162 and their functions will be described in further detail in relation to an exemplary method below and FIGS. 4A, 4B, 4C, 4D, 5A, 5B, 5C, 6A and 6B.

Figure 2:
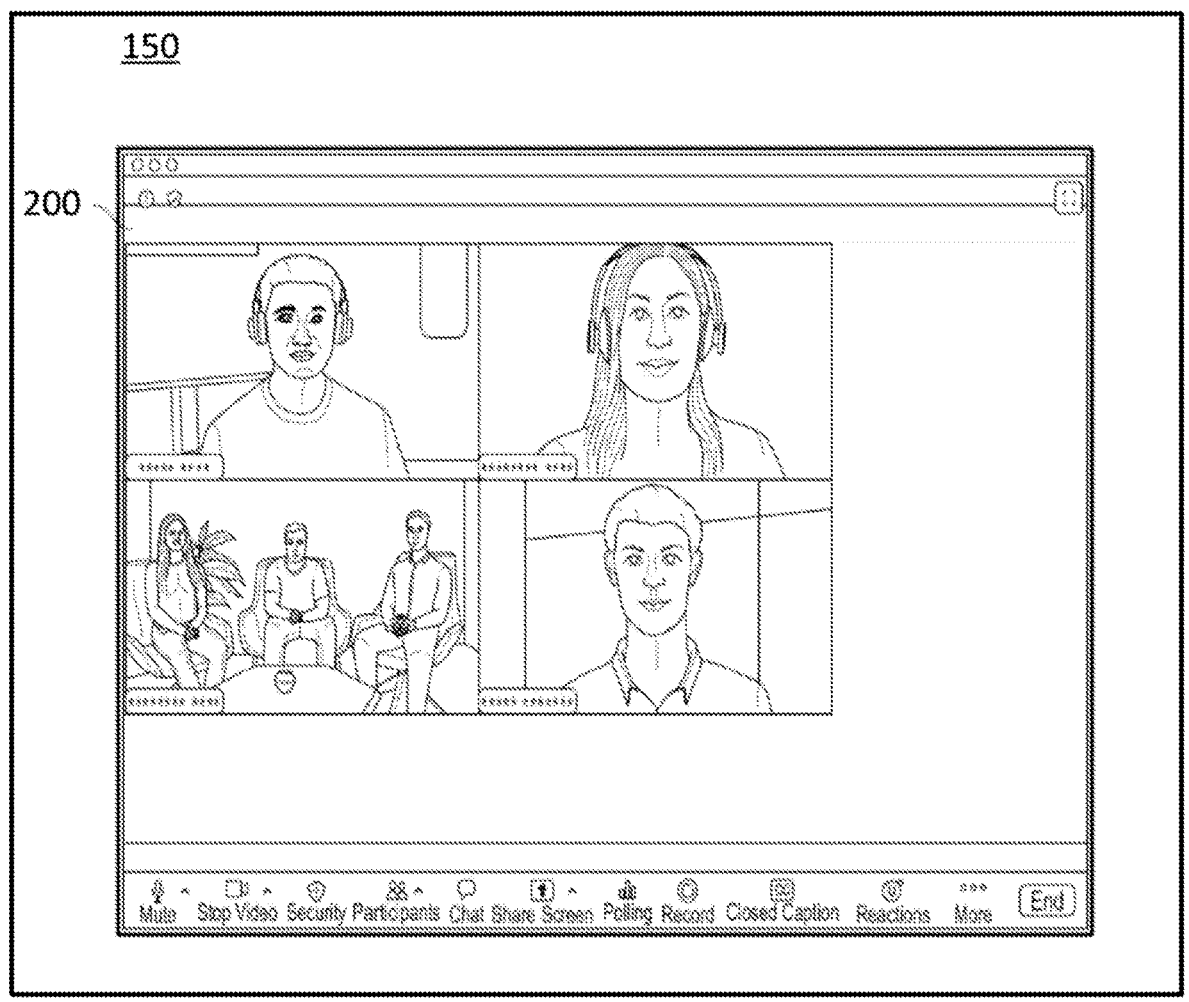
FIG. 2 is a diagram illustrating an exemplary environment in which some embodiments may operate.

As shown in the example of FIG. 2, a user account communications interface 200 for accessing and communicating with the platform 140 and displayed at a computer device 150. The interface 200 provides access to video data, audio data, chat data and meeting transcription related to an online event(s), such as a virtual webinar or a virtual meeting joined by a user account associated with the computer device 150. The interface 200 further provides various types of tools, functionalities, and settings that can be selected by a user account during an online event. Various types of virtual meeting control tools, functionalities, and settings are, for example, mute/unmute audio, turn on/off video, start meeting, join meeting, view and call contacts.

Figure 3:
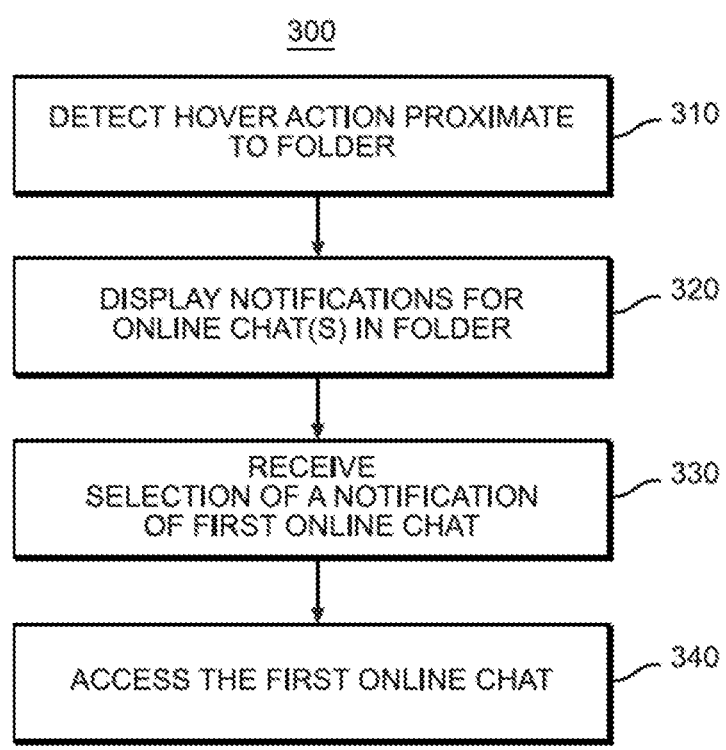
FIG. 3 is a diagram illustrating an exemplary flowchart according to some embodiments.

As shown in flowchart diagram 300 of the example of FIG. 3, the Folder Engine detects a hover action initiated by a recipient user account proximate to a folder created by the recipient user account. (Step 310) It is understood that, prior to detecting of the hover action, the Folder Engine receives a request from the recipient user account to instantiate (or create) the folder. In response to the request, the Folder Engine generates the folder. The Folder Engine further receives a selection from the recipient user account of one or more online chats to be placed within the folder. The Folder Engine receives from the recipient user account an ordering of the one or more selected online chats within the folder. In some embodiments, an online chat(s) and/or online channel(s) placed within the folder may be an online chat or online channel that was initiated prior to the request to instantiate the folder.

In some embodiments, prior to detecting of the hover action, the Folder Engine determines presence of at least one unread message in an online chat(s) that has been place in the folder and initiates display of an unread message badge proximate to the folder. For example, the Folder Engine determines presence of at least one unread message in multiple online chats organized by the recipient user account in the folder. The Folder Engine determines an aggregate number of unread messages in the multiple online chats indicates the aggregate number of unread messages in the unread message badge.

Based on detecting the hover action, the Folder Engine initiates display of one or more notifications that correspond to one or more online chats selected by the recipient user account to be organized in the folder. (Step 320) In some embodiments, a notification may include display of an identity of a sender user account or an online channel. The notification may further include display of an unread messages badge for each respective sender user account and online channel included in the notification. In some embodiments, a notification displays an identity of a sender user account from which one or more unread messages were sent to a first online chat between the sender user account and the recipient user account. The one or more unread messages are respective messages not yet accessed by the recipient user account.

The Folder Engine receives a selection from the recipient user account of a first notification that corresponds to a first online chat within the folder. (Step 330) Based on the selection of the first notification, the Folder Engine initiates access of the first online chat by the recipient user account. (Step 340) In some embodiments, the Folder Engine opens the folder in which the first online chat is located.

Figure 4A:
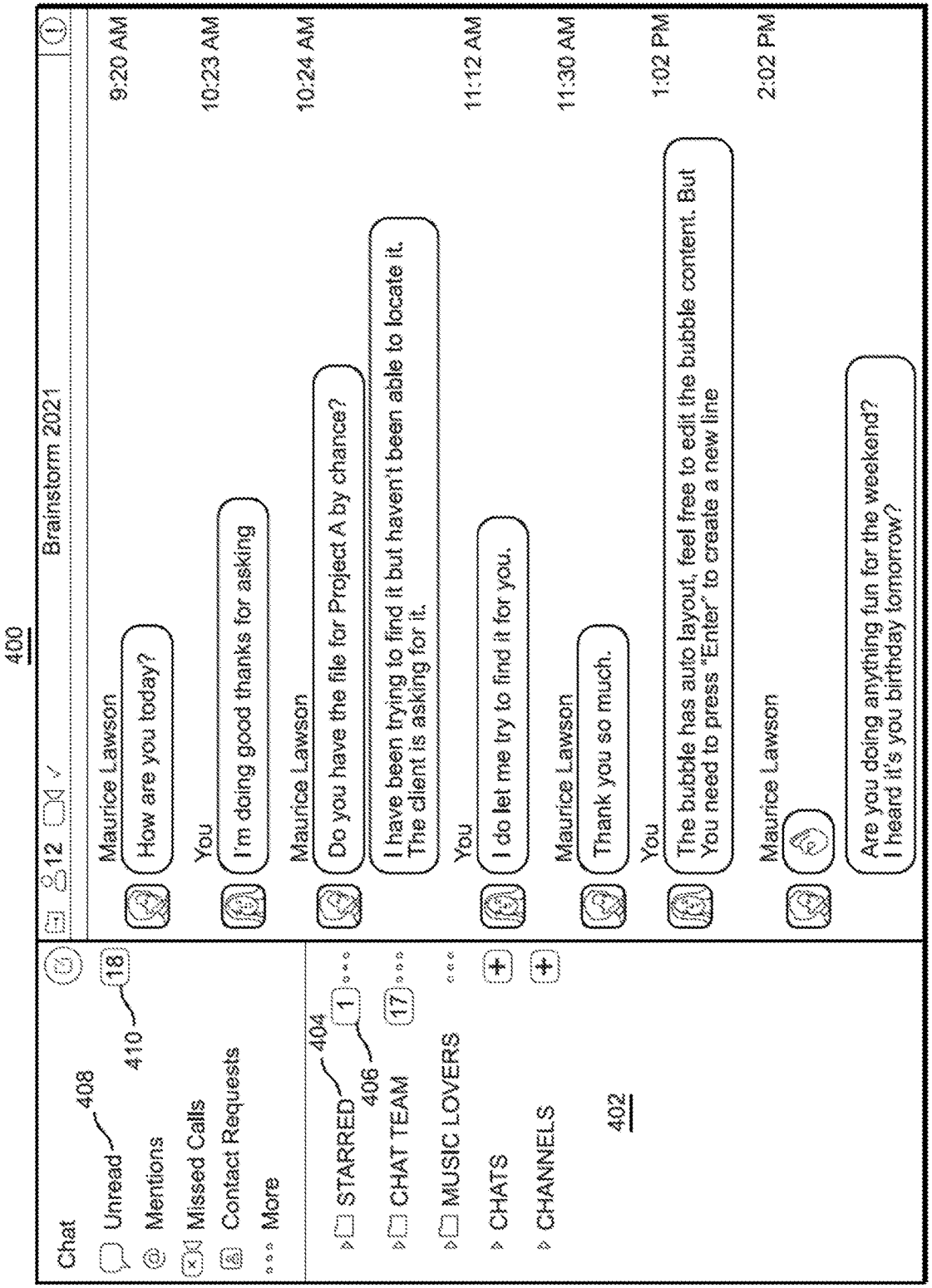

As shown in diagram 400 of the example of FIG. 4A, a user interface associated with a client application for a video communications environment may have a side bar 402. In some embodiments, the side bar 402 may be part of or associated with interface 200 illustrated in FIG. 2. In various embodiments, the side bar 402 may include a folder 404 and a badge 406. The folder 404 may include a plurality of online chat sessions and/or a plurality of online channels. Each online chat session may be between the recipient to user account and a particular sender user account(s). The badge 406 displayed proximate to the folder 404 displays a total aggregate number of unread messages across all online chat sessions that are organized within the folder 404. It is understood that an unread message is a message in an online chat session or in an online channel that has yet to be accessed by the recipient user account. In some embodiments, the recipient user account may select a preferred badge mode, in which one or more badges are displayed in a particular shape (such as a circle for example) without display of a number of unread messages. The recipient user account may toggle the preferred badge mode to be active or inactive.

The side bar 402 may further include an unread chat session indicator 408. In some embodiments, the unread chat session indicator 408 corresponds to a collection of online chat sessions and/or online channels that currently have messages that have yet to be read (or accessed) by the recipient user account. In some embodiments, the unread chat session indicator 408 provides access to any online chat session and/or online channel that currently includes one or more unread messages. An unread chat badge 410 is displayed proximate to the unread chat session indicator 408. The unread chat badge 410 displays a total aggregate number of unread messages across all online chat sessions and/or online channels. For example, as shown in the example of FIG. 4A, the unread chat badge 410 indicates a total number of 18 unread messages.

Figure 4B:
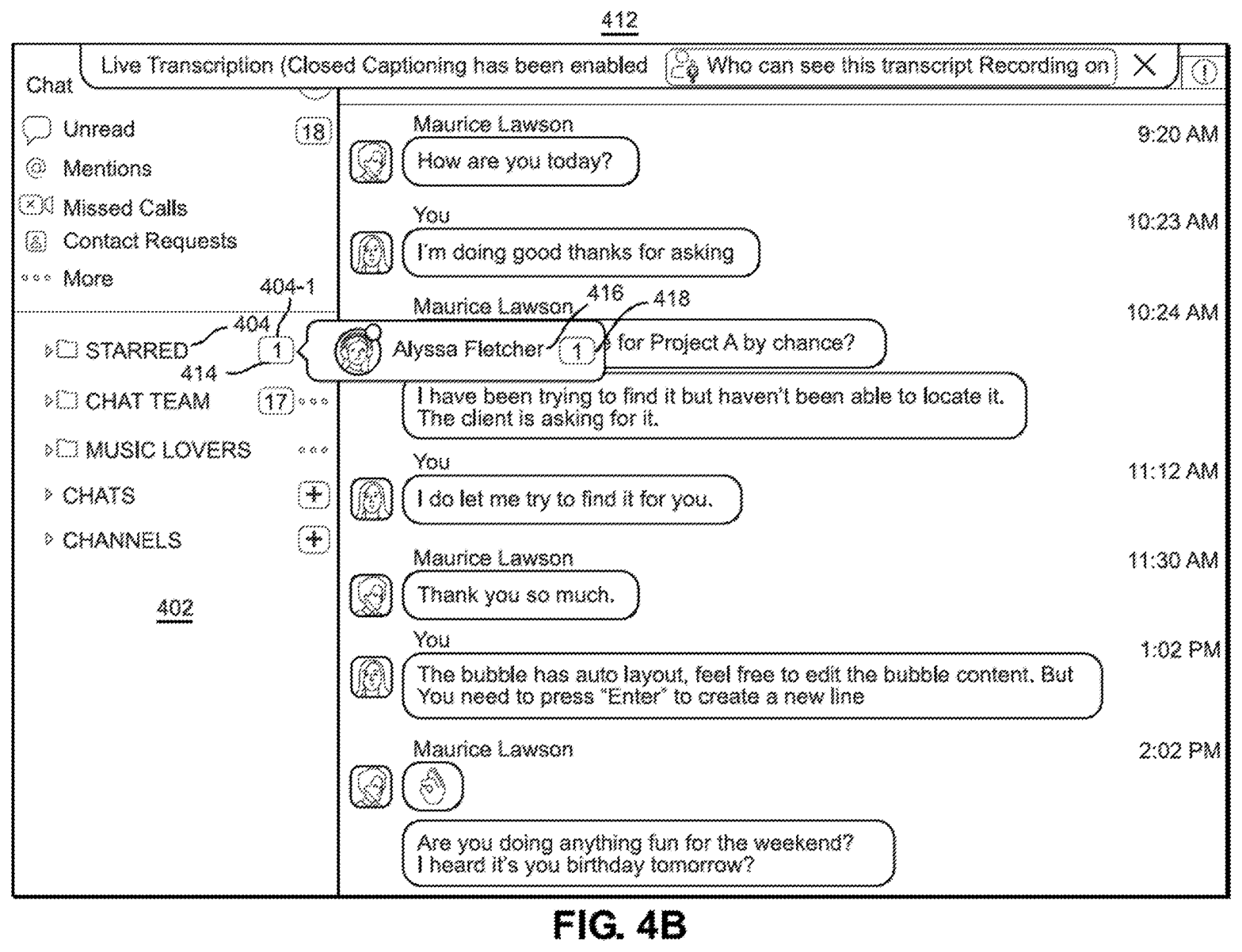

As shown in diagram 412 of the example of FIG. 4B, the Folder Engine detects a hover action 414 proximate to a folder 404. In some embodiments, the hover action 414 may be an occurrence of user input data placed near an unread message badge 404-1 that is displayed proximate to the folder 404. For example, the hover action 414 may be placement of a mouse pointer proximate to the unread message badge 404-1 whereby the hover action 414 is detected based on the mouse pointer maintaining its presence proximate to the badge 404-1 for at least a predefined required amount of time.

In response to detecting the hover action 414, the Folder Engine displays a notification. In some embodiments, the notification may be a display of an identity 416 of sender user account. The identity 416 of the second user account may represent an online chat between the sender user account and the recipient user account. The notification may further include display of a badge 418. The badge 418 indicates a total number of unread messages sent from the sender user account currently present in the online chat. For example, the total number of unread messages in the online chat maybe one or more messages sent from the sender user account not yet accessed by the recipient user account.

Figure 4C:
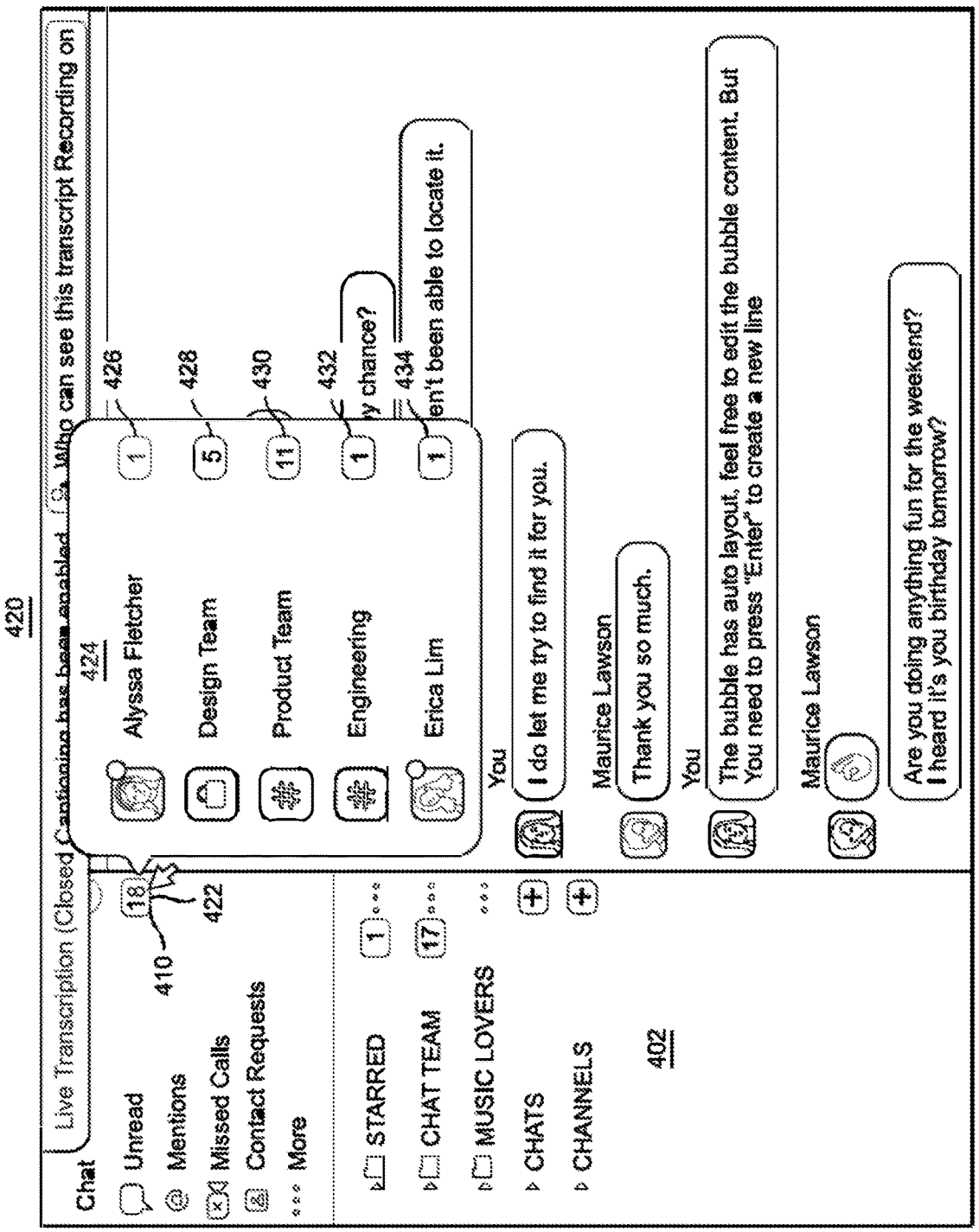

As shown in diagram 420 of the example of FIG. 4C, the Folder Engine detects a hover action 422 proximate to the unread chat badge 410. In response to detecting the hover action 422, the Folder Engine displays a notification 424 that includes display of the identities of multiple sender user accounts and/or online channels. For example, an identity 426, 434 may represent an online chat session between a respective sender user account and the recipient user account. For example, an identity 428, 430, 434 may represent an online channel to which the recipient user account is subscribed. The unread chat badge 410 indicates an aggregate total number of unread messages sent from each of the sender user accounts and/or online channels displayed in the notification 424.

Figure 4D:
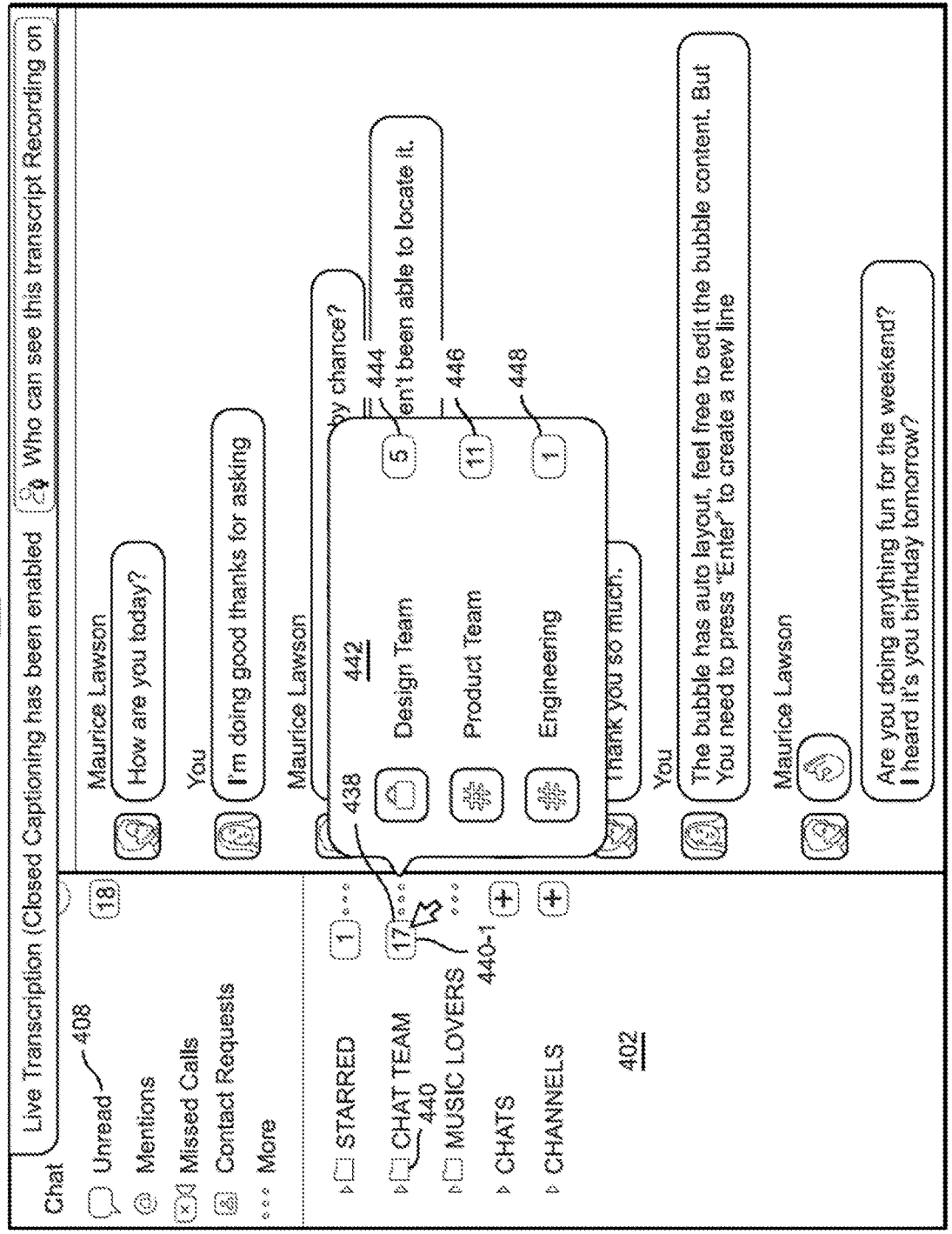

As shown in diagram 436 of the example of FIG. 4D, the Folder Engine detects a hover action 438 proximate to an unread messages badge 440-1 of a folder 440. In response to detecting the hover action 438, the Folder Engine displays a notification 442 that includes display of identities of multiple channels organized within the folder 440. The multiple channels in the folder 440 are organized and displayed according to an organizational order selected by the recipient user account. Each identity displayed in the notification 442 includes a respective unread messages badge 444, 446, 448. Each unread messages badge 444, 446, 448 indicates a total number of unread messages currently present in the corresponding online channel. The unread messages badge 440-1 of the folder 440 indicates an aggregate total number of unread messages currently in all the online channels displayed in the notification 442.

Figure 5A:
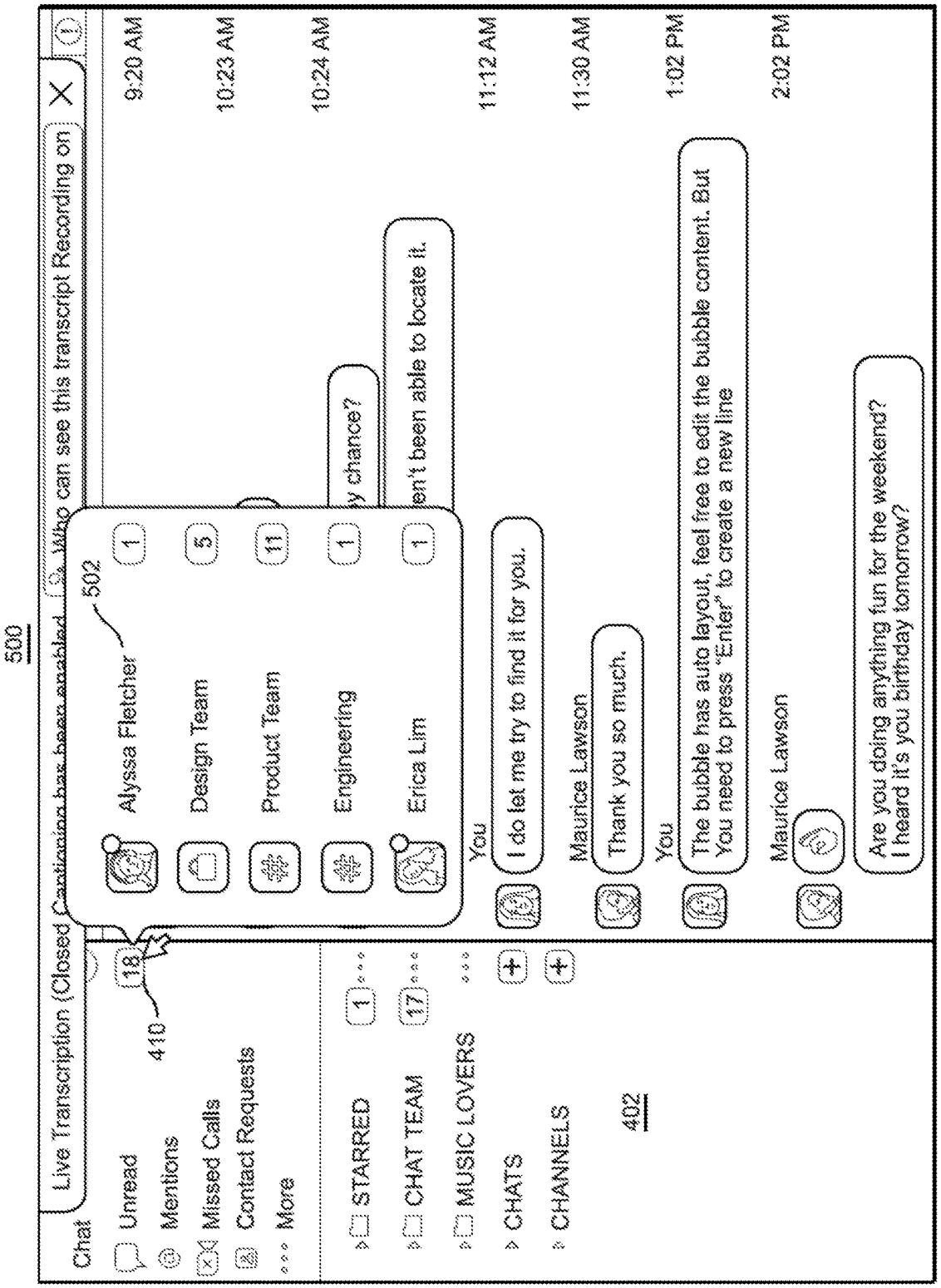
FIGS. 5A, 5B and 5C are each a diagram illustrating an exemplary environment in which some embodiments may operate.

As shown in diagram 500 of the example of FIG. 5A, the Folder Engine detects selection of an identity 502 of a sender user account. For example, the selected identity 502 may further represent an online chat session between the sender user account in the recipient user account. As previously described, the unread chat badge 410 indicates a total aggregate number of unread messages.

Figure 5B:
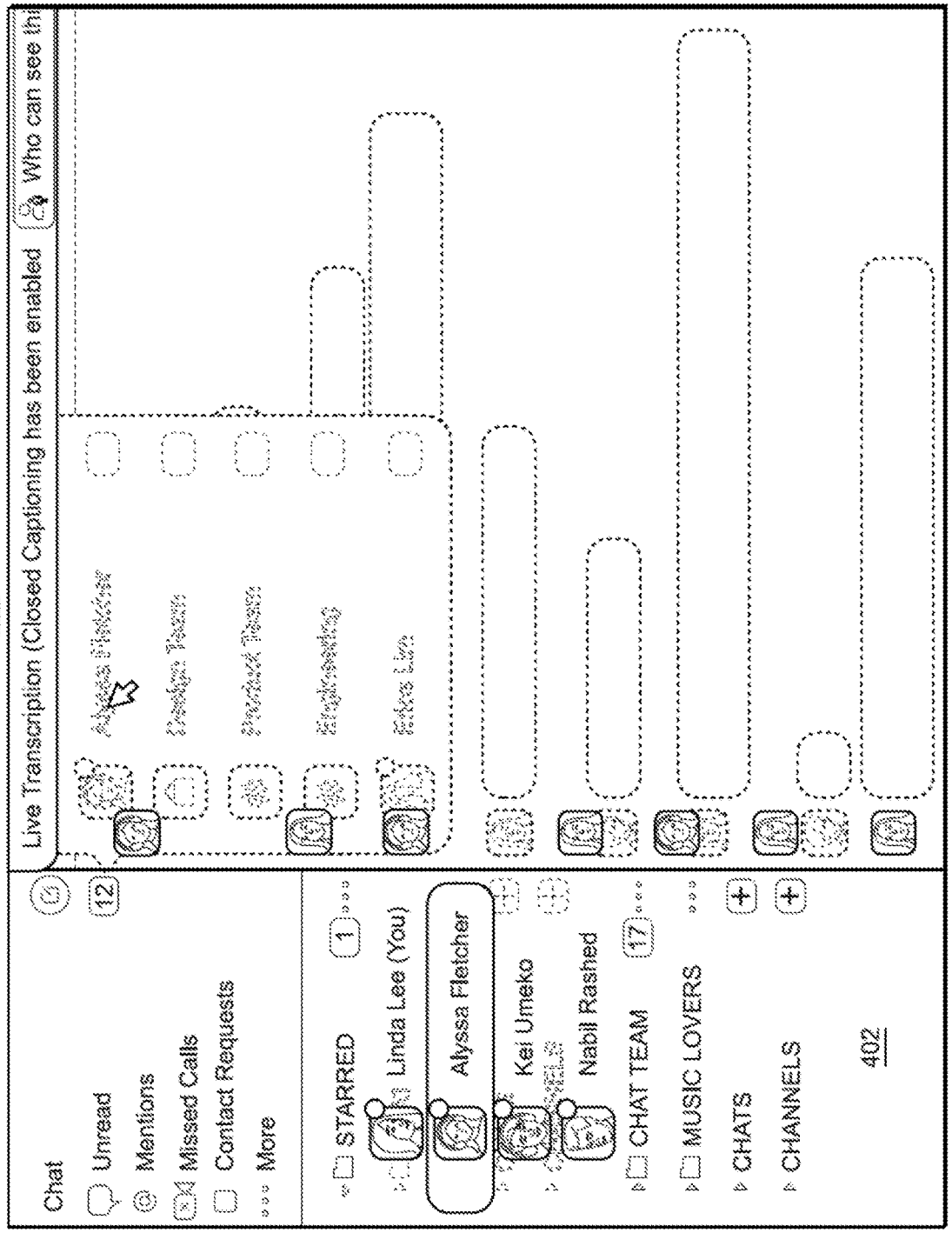

As shown in diagram 504 of the example of FIG. 5B, in response to detecting selection of the identity 502 of the sender user account, the Folder Engine initiates, renders and displays a graphic transition to display an open folder. In some embodiments, detection of the selection of the identity 502 further triggers the Folder Engine to open a folder in which the corresponding online chat session has been placed by the recipient user account.

Figure 5C:
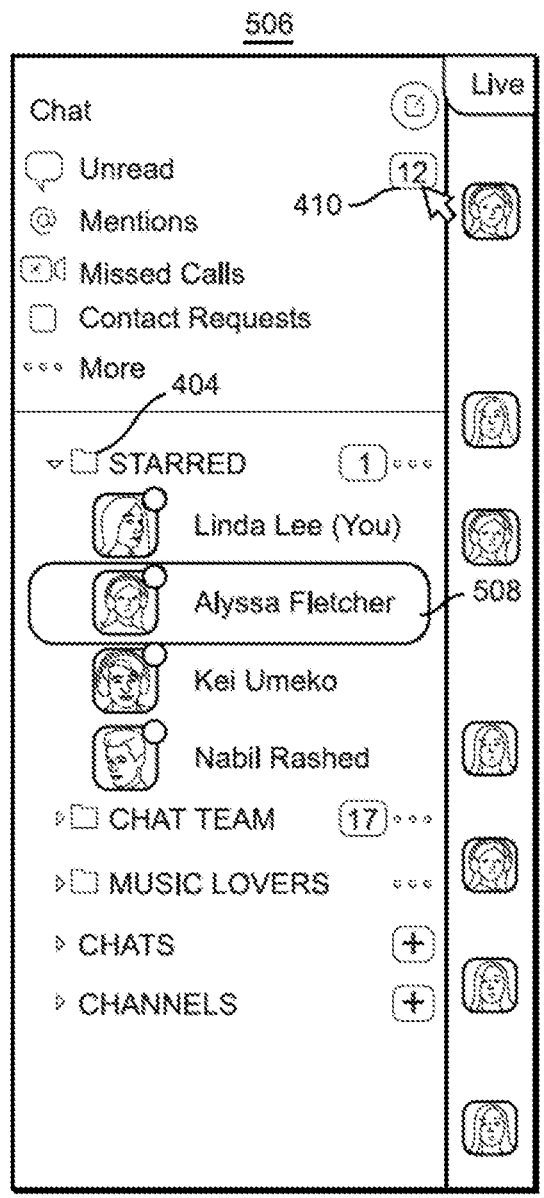

As shown in diagram 506 of the example of FIG. 5C, the graphic transition results in display of an open folder 404. The display of the open folder 404 includes a presentation of each online chat session that is organized within the folder 404 according to an organizational order selected by the recipient user account. Further, the Folder Engine initiates access, by the recipient user account, of the online chat session 508 that corresponds to the selected identity 502. Since the online chat session 508 has a sole location in the folder—as determined by the recipient user account, receiving selection of identity 502 by the Folder Engine thereby acts as a shortcut operation(s) for triggering the opening of the folder 404 and the recipient user account accessing the corresponding online chat session 508 and/or the recipient user account accessing the unread message(s) in the corresponding online chat session 508.

Since there was one unread message in the online chat session 508 and the recipient user account has now accessed that online chat session 508, the unread chat badge 410 indicates an updated aggregate total number of unread messages. For example, the Folder Engine decrements an aggregate total number of unread messages indicated by the unread chat badge 410 from 18 to 17 to reflect the recipient user account's access of the unread message in the online chat session 508.

Figure 6A:
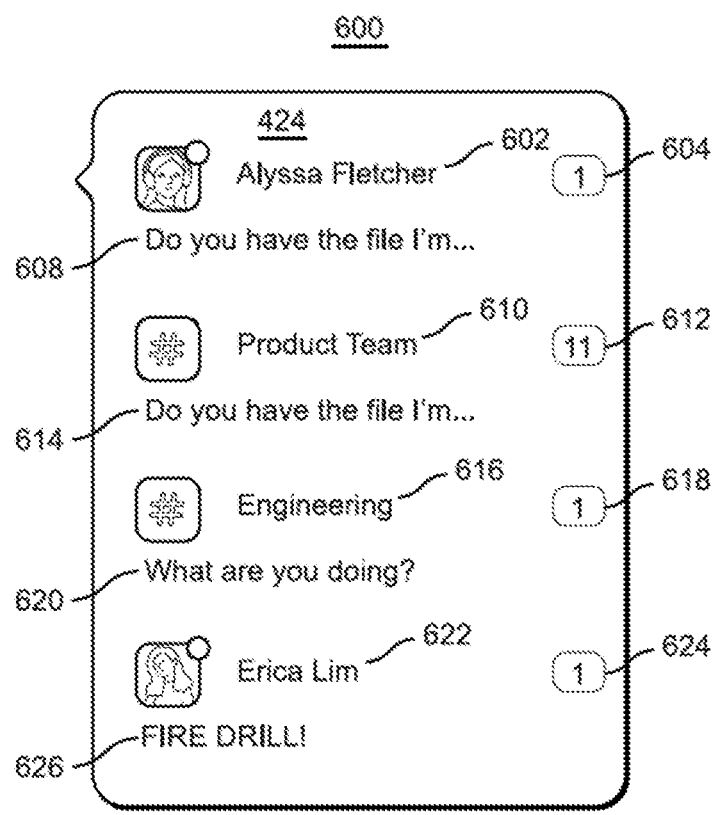
FIGS. 6A and 6B are each a diagram illustrating an exemplary environment in which some embodiments may operate.

As shown in diagram 600 of the example of FIG. 6A, in some embodiments a notification 424 may display the identities 602, 610, 616, 622 of multiple sender user accounts and/or channels. For example, the displayed identities 602, 622 of sender user accounts may further represent distinct online chat sessions. Each displayed identity 602, 610, 616, 622 includes display of an unread message badge 604, 612, 618, 624. Each unread message badge 604, 612, 618, 624 indicates a current total number of unread messages present in the corresponding online chat session or channel. The notification 424 further includes display of a preview 608, 614, 620, 626 of a most recently received unread message from each sender user account 602, 622 or a most recently received unread message in each channel 610, 616.

Figure 6B:
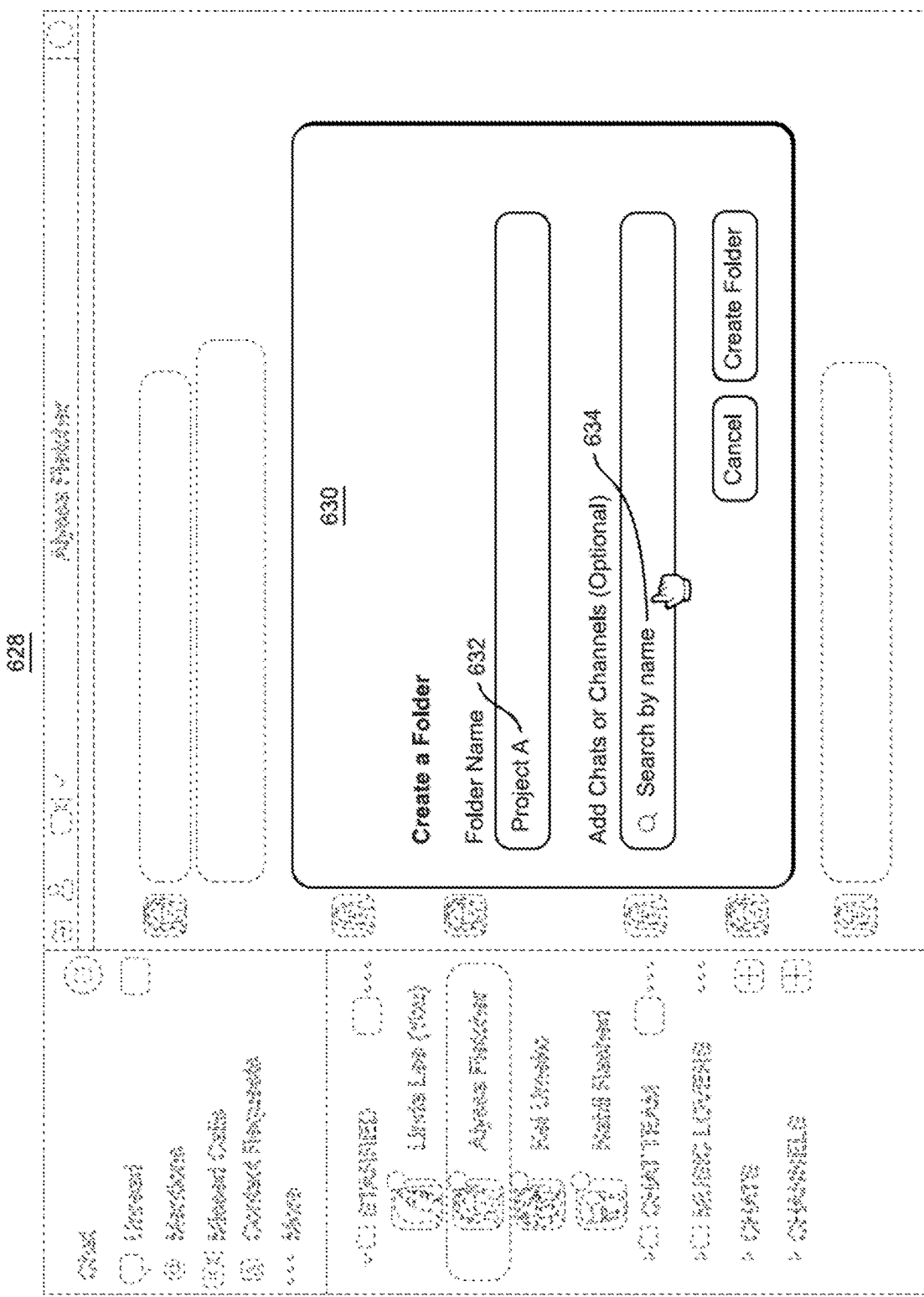

As shown in diagram 628 of the example of FIG. 6B, the Folder Engine displays a folder creation functionality 630. The functionality 630 includes a folder name text field 632 in which the recipient user account may input a folder name to be assigned to a newly created folder. The functionality 630 further includes a chat or channel selection field 634 through which the recipient user account may search for and select one or more online chat sessions and one or more online channels to be included in the newly created folder. It is further understood that the Folder Engine may further receive folder organizational data selected by the recipient user account. The folder organizational data represents an ordering of the one or more online chat sessions and/or the one or more online channels the recipient user account has selected for inclusion within the folder.

Figure 7:
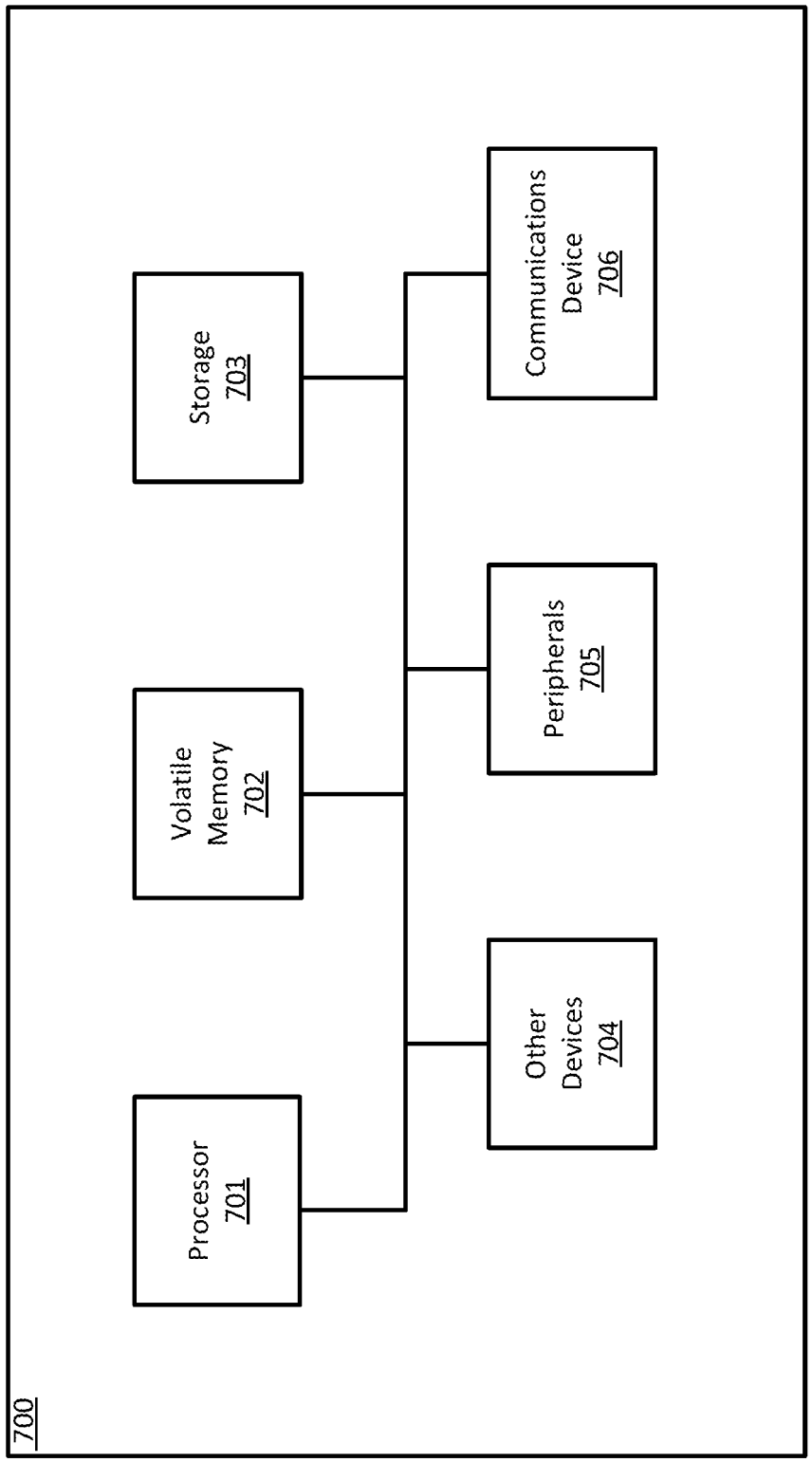
FIG. 7 is a diagram illustrating an exemplary environment in which some embodiments may operate.

FIG. 7 is a diagram illustrating an exemplary computer that may perform processing in some embodiments. As shown in the example of FIG. 7, an exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-Rand DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

It will be appreciated that the present disclosure may include any one and up to all of the following examples.

Example 1: A computer-implemented method comprising: detecting a hover action initiated by a recipient user account proximate to a folder created by the recipient user account; based on detecting the hover action, initiating display of one or more notifications that correspond to one or more online chats selected by the recipient user account to be organized in the folder; receiving a selection from the recipient user account of a first notification that corresponds to a first online chat within the folder; and based on the selection of the first notification, initiating access of the first online chat by the recipient user account.

Example 2: The method of Example 1, wherein detecting a hover action initiated by a recipient user account proximate to a folder created by the recipient user account; based on detecting the hover action, initiating display of one or more notifications that correspond to one or more online chats selected by the recipient user account to be organized in the folder; receiving a selection from the recipient user account of a first notification that corresponds to a first online chat within the folder; and based on the selection of the first notification, initiating access of the first online chat by the recipient user account.

Example 3: The method of any Examples 1-2, wherein a respective online chat selected by the recipient user account was initiated prior to the request to instantiate the folder.

Example 4: The method of any Examples 1-3, further comprising: prior to detecting of the hover action: determining presence of at least one unread message in the first online chat; and initiating display of an unread message badge proximate to the folder.

Example 5: The method of any Examples 1-4, further comprising: determining presence of at least one unread message in multiple online chats organized by the recipient user account in the folder; determining an aggregate number of unread messages in the multiple online chats; and indicating the aggregate number of unread messages in the unread message badge.

Example 6: The method of any Examples 1-5, wherein initiating display of notifications comprises: displaying an identity of a first sender user account from which one or more unread messages were sent to the first online chat, the one or more unread messages comprising respective messages not yet accessed by the recipient user account.

Example 7: The method of any Examples 1-6, wherein displaying an identity of a first sender user account comprises: displaying an indication of a total number of unread messages sent from the first sender user account to the first online chat, the total number of unread messages comprising a number of unread messages sent from the first sender user account not yet accessed by the recipient user account.

Example 7: The method of any Examples 1-6, wherein displaying an identity of a first sender user account comprises: displaying an indication of a total number of unread messages sent from the first sender user account to the first online chat, the total number of unread messages comprising a number of unread messages sent from the first sender user account not yet accessed by the recipient user account.

Example 8: A non-transitory computer-readable medium having a computer-readable program code embodied therein to be executed by one or more processors, the program code including instructions for: detecting a hover action initiated by a recipient user account proximate to a folder created by the recipient user account; based on detecting the hover action, initiating display of one or more notifications that correspond to one or more online chats selected by the recipient user account to be organized in the folder; receiving a selection from the recipient user account of a first notification that corresponds to a first online chat within the folder; and based on the selection of the first notification, initiating access of the first online chat by the recipient user account.

Example 9: The non-transitory computer-readable medium of Example 8, wherein the first online chat comprises one of: a chat message session between a first sender user account and the recipient user account; a chat message session between a plurality of sender user accounts and the recipient user account; and a chat message channel to which the recipient user account is subscribed.

Example 10: The non-transitory computer-readable medium of any Examples 8-9, wherein initiating display of one or more notifications comprises: displaying an identity of a first sender user account that belongs to the first online chat in the folder; displaying a total number of unread messages sent from the first sender account; and displaying a first preview of a particular unread message sent from the first sender account.

Example 11: The non-transitory computer-readable medium of any Examples 8-10, further comprising: displaying an identity of a second sender user account that belongs to a second online chat in the folder; displaying a total number of unread messages sent from the second sender account; and displaying a second preview of a particular unread message sent from the second sender account.

Example 12: The non-transitory computer-readable medium of any Examples 8-11, further comprising: concurrently displaying the respective identities of the first and second sender accounts, the total number of unread messages sent from the first and second sender accounts, the first preview and the second preview.

Example 13: The non-transitory computer-readable medium of any Examples 8-12, further comprising: wherein the total number of unread messages sent from the first sender account comprises: a number of messages sent from the first sender account to the first online chat the recipient user account has yet to access; and wherein the total number of unread messages sent from the second sender account comprises: a number of messages sent from the second sender account to the second online chat the recipient user account has yet to access.

Example 14: The non-transitory computer-readable medium of any Examples 8-13, further comprising: receiving selection from the recipient user account of the identity of the second sender account by account; and initiating access of the second online chat by the recipient user account.

Example 15: The non-transitory computer-readable medium of any Examples 8-14, further comprising: decrementing the total number of unread messages sent from the second sender account.

Example 16: A communication system comprising one or more processors configured to perform the operations of: detecting a hover action initiated by a recipient user account proximate to a folder created by the recipient user account; based on detecting the hover action, initiating display of one or more notifications that correspond to one or more online chats selected by the recipient user account to be organized in the folder; receiving a selection from the recipient user account of a first notification that corresponds to a first online chat within the folder; and based on the selection of the first notification, initiating access of the first online chat by the recipient user account.

Example 17: The communication system of Example 16, further comprising: prior to detecting of the hover action in a video communication environment: receiving a request from the recipient user account, in the video communication environment, to instantiate the folder; generating the folder; receiving a selection from the recipient user account, in the video communication environment, of one or more online chats for the folder; and receiving from the recipient user account, in the video communication environment, an ordering of the one or more selected online chats within the folder.

Example 18: The communication system of any Examples 16-17, further comprising: wherein in the video communication environment comprises a client application.

Example 19: The communication system of any Examples 16-18, further comprising: storing the folder, the one or more online chats for the folder and the ordering of the one or more selected online chats in cloud storage associated with the video communication environment.

Example 20: The communication system of any Examples 16-19, further comprising detecting a hover action proximate to a first badge associated with an unread message indicator for a collection of online chats that currently include one or more unread messages; in response to the hover action, displaying a notification that includes display of an identity of a sender user account and a second badge, the sender user account corresponding to a respective online chat session between the sender user account and the recipient user account, the second badge indicating a current number of unread messages sent from the sender user account in the respective online chat session; receiving a selection from the recipient user account of the identity of the sender user account displayed in the notification; based on the selection: (i) opening a folder in which the respective online chat session is located, the respective online chat session previously selected to be situated in the folder by the recipient user account; (ii) displaying the opened folder; and (iii) initiating access by the recipient user account of one or more unread messages in the respective online chat session.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

That which is claimed is:

1. A computer-implemented method comprising:
   detecting an input action proximate to a folder created by a recipient user account, wherein the folder comprises one or more online chats, wherein the one or more online chats comprises at least one unread message;
   providing a notification relating to the at least one unread message in the one or more online chats in the folder, wherein the notification comprises at least one online chat identity that correspond to at least one online chat of the one or more online chats comprising the at least one unread message;
   receiving a selection of a first online chat identity that corresponds to a first online chat within the folder; and
   based on the selection of the first online chat identity, providing access to corresponding unread messages in the first online chat.

2. The computer-implemented method of claim 1, further comprising:
   prior to detecting the input action:
   receiving a request from the recipient user account to instantiate the folder;
   generating the folder; and
   receiving from the recipient user account a selection of one or more online chats to be organized in the folder.

3. The computer-implemented method of claim 2, wherein the first online chat selected by the recipient user account was initiated prior to the request to instantiate the folder.

4. The computer-implemented method of claim 1, further comprising:
   prior to detecting of the input action:
   determining that the one or more online chats comprise at least one unread message; and
   initiating display of an unread message badge proximate to the folder.

5. The computer-implemented method of claim 4, further comprising:
   determining an aggregate number of unread messages in the one or more online chats; and
   indicating the aggregate number of unread messages in the unread message badge.

6. The computer-implemented method of claim 1, wherein the notification further comprises a total number of unread messages corresponding to each of the at least one online chat identity relating to the one or more unread messages.

7. The computer-implemented method of claim 1, wherein the notification further comprises a preview of a most recently received unread message corresponding to each of the at least one online chat identity.

8. A non-transitory computer-readable medium comprising processor-executable instructions configured to cause one or more processors to:
   detect an input action proximate to a folder created by a recipient user account, wherein the folder comprises one or more online chats, wherein the one or more online chats comprises at least one unread messages;
   provide a notification relating to the at least one unread message in the one or more online chats in the folder, wherein the notification comprises at least one online chat identity that correspond to at least one online chat of the one or more online chats comprising the at least one unread message;
   receive a selection of a first online chat identity that corresponds to a first online chat within the folder; and
   based on the selection of the first online chat identity, provide access to corresponding unread messages in the first online chat by the recipient user account.

9. The non-transitory computer-readable medium of claim 8, wherein the first online chat identity comprises one of:
   a chat message session between a first sender user account and the recipient user account;
   a chat message session between a plurality of sender user accounts and the recipient user account; and
   a chat message channel to which the recipient user account is subscribed.

10. The non-transitory computer-readable medium of claim 8, wherein providing a notification relating to the at least one unread message in one or more online chats in the folder comprises:
    displaying an identity of a first sender user account that belongs to the first online chat identity in the folder;
    displaying a total number of unread messages sent from the first sender user account; and
    displaying a first preview of a particular unread message sent from the first sender user account.

11. The non-transitory computer-readable medium of claim 10, wherein providing a notification relating to the at least one unread message in one or more online chats in the folder further comprises:
    displaying an identity of a second sender user account that belongs to a second online chat identity in the folder;
    displaying a total number of unread messages sent from the second sender user account; and
    displaying a second preview of a particular unread message sent from the second sender user account.

12. The non-transitory computer-readable medium of claim 11, further comprising processor-executable instructions configured to cause one or more processors to:
    concurrently display the respective identities of the first sender user account and the second sender user account, the total number of unread messages sent from the first sender user account and the second sender user account, the first preview and the second preview.

13. The non-transitory computer-readable medium of claim 12,
    wherein the total number of unread messages sent from the first sender user account comprises: a number of messages sent from the first sender user account to the first online chat the recipient user account has yet to access; and
    wherein the total number of unread messages sent from the second sender user account comprises: a number of messages sent from the second sender user account to the second online chat the recipient user account has yet to access.

14. The non-transitory computer-readable medium of claim 13, further comprising processor-executable instructions configured to cause one or more processors to:
    receive selection from the recipient user account of the identity of the second sender user account by account; and
    provide access to corresponding unread messages in the second online chat by the recipient user account based on the selection of the first online chat identity.

15. The non-transitory computer-readable medium of claim 14, further comprising processor-executable instructions configured to cause one or more processors to:
    decrement the total number of unread messages sent from the second sender user account.

16. A communication system comprising:
    a communications interface;
    a non-transitory computer-readable medium; and
    one or more processors communicatively coupled to the communications interface and the non-transitory computer-readable medium, the one or more processors configured to execute processor-executable instructions stored in the non-transitory computer-readable medium to:
    detect an input action proximate to a folder created by a recipient user account, wherein the folder comprises one or more online chats, wherein the one or more online chats comprises at least one unread messages;
    provide a notification relating to the at least one unread message in the one or more online chats in the folder, wherein the notification comprises at least one online chat identity that correspond to at least one online chat of the one or more online chats comprising the at least one unread message;
    receive a selection of a first online chat identity that corresponds to a first online chat within the folder; and
    based on the selection of the first online chat identity, provide access to corresponding unread messages in the first online chat by the recipient user account.

17. The communications system of claim 16, wherein the one or more processors are configured to execute further processor-executable instructions stored in the non-transitory computer-readable medium to:
    prior to detecting the input action in a video communication environment:
    receive a request from the recipient user account, in the video communication environment, to instantiate the folder;
    generate the folder; and
    receive from the recipient user account a selection, in the video communication environment, of one or more online chats to be organized in the folder.

18. The communications system of claim 17, wherein in the video communication environment comprises a client application.

19. The communications system of claim 17, wherein the one or more processors are configured to execute further processor-executable instructions stored in the non-transitory computer-readable medium to:

store the folder, the one or more online chats in the folder, and an ordering of the one or more online chats in cloud storage associated with the video communication environment.

20. The communications system of claim 17, wherein the one or more processors are configured to execute further processor-executable instructions stored in the non-transitory computer-readable medium to:

detect the input action proximate to a first badge associated with an unread message indicator for the one or more online chats comprising the at least one unread message;

in response to detecting the input action, display the notification comprising an identity of a sender user account and a second badge, the sender user account corresponding to a respective online chat session between the sender user account and the recipient user account, the second badge indicating a current number of a set of unread messages sent from the sender user account in the respective online chat session;

receive the selection from the recipient user account of the identity of the sender user account displayed in the notification; and based on the selection, provide access to the set of unread messages in the respective online chat session.

* * * * *